United States Patent [19]

Pool

[11] Patent Number: 5,580,360
[45] Date of Patent: Dec. 3, 1996

[54] APPARATUS FOR AUTOMATICALLY PRODUCING BURNABLE LOGS

[75] Inventor: Harvey E. Pool, Portland, Oreg.

[73] Assignee: Star 13 Incorporated, Milwaukie, Oreg.

[21] Appl. No.: 372,778

[22] Filed: Jan. 13, 1995

[51] Int. Cl.$^6$ ............................. C10L 11/06; C10L 5/40
[52] U.S. Cl. .................................. 44/535; 44/530
[58] Field of Search ................................. 44/535

[56] References Cited

U.S. PATENT DOCUMENTS

| | | | |
|---|---|---|---|
| 3,706,540 | 12/1972 | Stanton | 44/535 |
| 3,973,922 | 8/1976 | Williams | 44/535 |
| 3,986,845 | 10/1976 | Hotchkiss | 44/535 |
| 4,042,343 | 8/1977 | Bernard | 44/535 |
| 4,120,666 | 10/1978 | Lange | 44/535 |
| 4,539,011 | 9/1985 | Kretzschmann | 44/535 |
| 5,066,311 | 11/1991 | Chalmer | 44/535 |

*Primary Examiner*—Ellen M. McAvoy
*Attorney, Agent, or Firm*—Marger Johnson McCollom & Stolowitz, P.C.

[57] ABSTRACT

This invention is directed to a method and a system for producing burnable logs from full-size feed material. The burnable logs are produced by providing the full-size feed material which is particularized to form a reduced-size feed material. Next, the reduced-size feed material and an adhesive material are automatically combined to form an adhesive-containing reduced-size feed material. The combined adhesive-containing reduced-size feed material is automatically compacted to form said burnable logs.

20 Claims, 6 Drawing Sheets

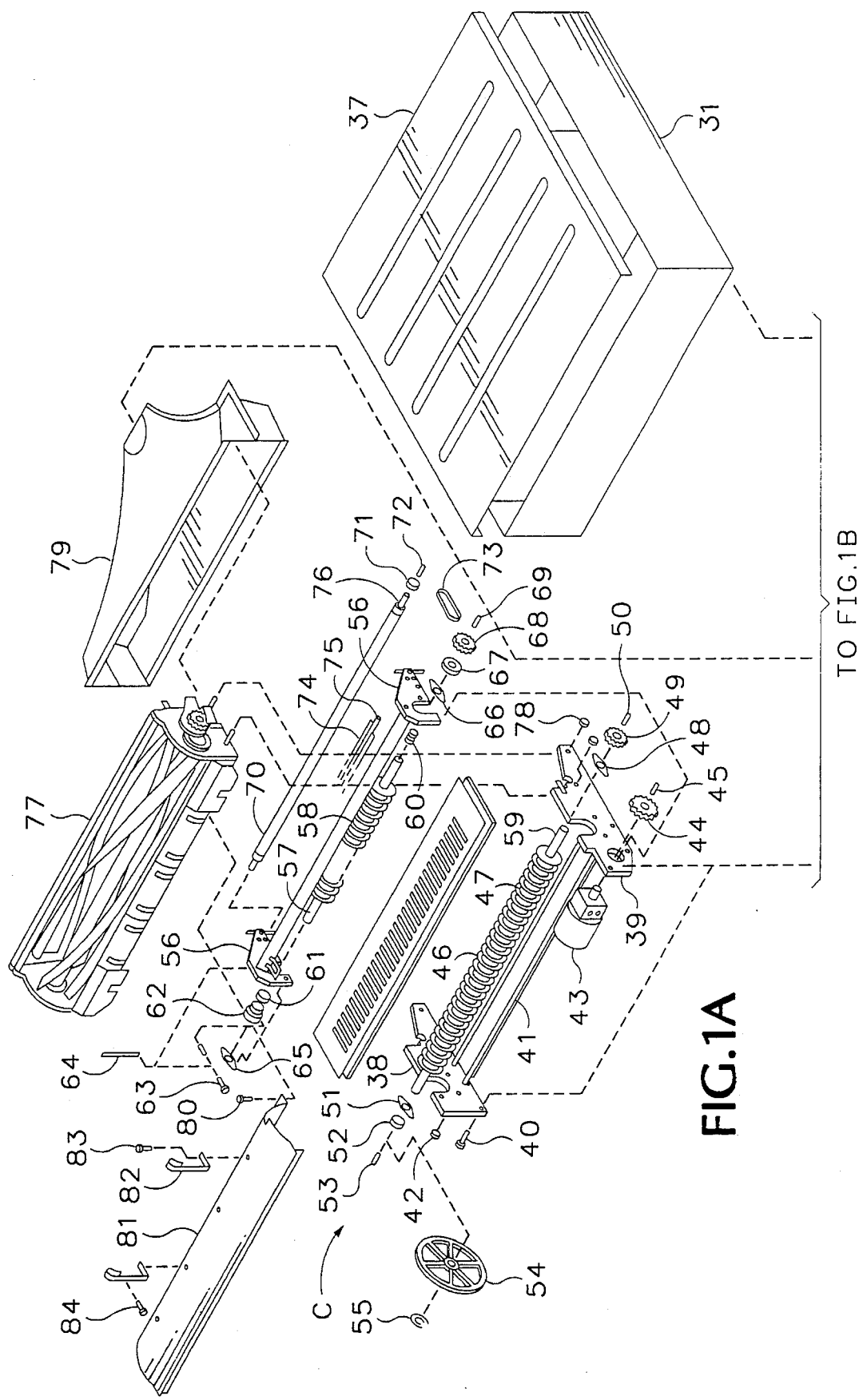

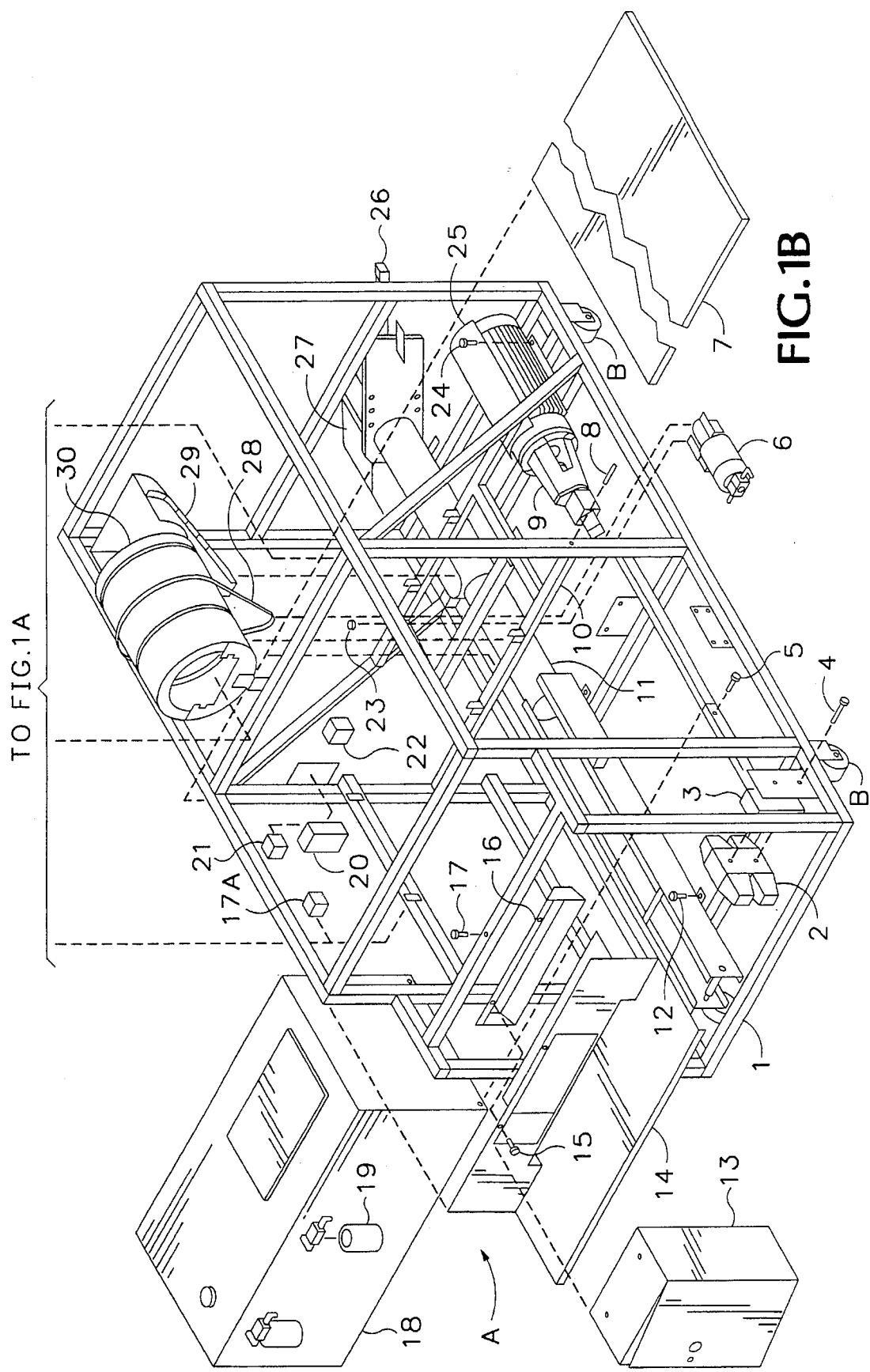

APPARATUS FOR AUTOMATICALLY PRODUCING BURNABLE LOGS

BACKGROUND OF THE INVENTION

The present invention relates generally to method and to an apparatus for automatically compacting flammable material, and more particularly to a method and apparatus for converting flammable material, such as cardboard, into compact burnable logs.

U.S. Pat. No. 3,986,845, which is incorporated herein by reference, relates to an apparatus for compacting cardboard sheet material. The apparatus includes means for advancing the sheet material and for completely severing the same during such advance in two different directions thereby forming chips of the material. It also includes a chamber for receiving advancing material chips and means for compacting the material chips in the chamber.

SUMMARY OF THE INVENTION

This invention is directed to a method and a system for producing burnable logs from full-size feed material. The burnable logs are produced by providing the full-size feed material which is particularized to form a reduced-size feed material. Next, the reduced-size feed material and an adhesive material are automatically combined to form an adhesive-containing reduced-size feed material. The combined adhesive-containing reduced-size feed material is automatically compacted to form said burnable logs.

Accordingly, it is the general objective of the present invention to provide a compacting apparatus which is arranged to convert cardboard, wood chips, or other feed material into a compact, log-like form. Preferably, the feed material is of a flammable nature such as cardboard which produces an end product which can be burned in a fireplace.

Preferably, the feed material which is automatically particularizing is automatically severing at spaced intervals thus reducing the feed material into a number of plurality of small chips. In a typical method of this invention, the feed material is delivered to a transverse cutting mechanism. The feed material, typically cardboard, is automatically severed at spaced intervals, thus reducing the cardboard or other material into a number of plurality of small chips which are lightweight, typical having a transverse dimensions of about $\frac{3}{8} \times \frac{5}{8}$ inch.

A transverse cutter is preferably arranged to move cardboard downwardly in its cutting action so as to propel the lightweight chips both by mechanical contact and fan action to a downwardly directed discharge chute that empties into a rotating drum, which tumbles the chips and at the same time, because of a slight slop, effects a gradual forward motion of the chips through the drum. If the raw material is to be in the form of small wood chips or the like, the initial cutting operations can be eliminated, and such chips be delivered directly into the rotating drum.

Adhesive material, preferably in the form of a water soluble glue, is preferably automatically sprayed on the chips, typically as the chips enter the drum. In this way, the adhesive coating is applied thereto so that it substantially completely covers of the chips.

The coated chips emerges from the exit end of the rotating drum, drops downwardly though a discharge tube into a compacting chamber, preferably having a generally cylindrical cross-section. Periodically a hydraulic ram is automatically actuated to move axially within the cylindrical chamber to compress the quantity of chips therewithin. Preferably, when the repetitive compaction operations are complete, the exit door to the chamber is automatically opened whereupon the ram effects final ejection of the compacted cylindrically-shaped unit.

The product is typically coated with a wax-like coating material and sold as a burnable unit in a fireplace or the like. Alternatively, the compacted unit can be subsequently recycled in the manufacture of paper products.

BRIEF DESCRIPTION OF DRAWINGS

FIGS. 1A, 1B and 1C are exploded perspective views of the various components of the apparatus for automatically producing burnable logs of the present invention.

DETAILED DESCRIPTION OF A PREFERRED EMBODIMENT

Figure 1C:
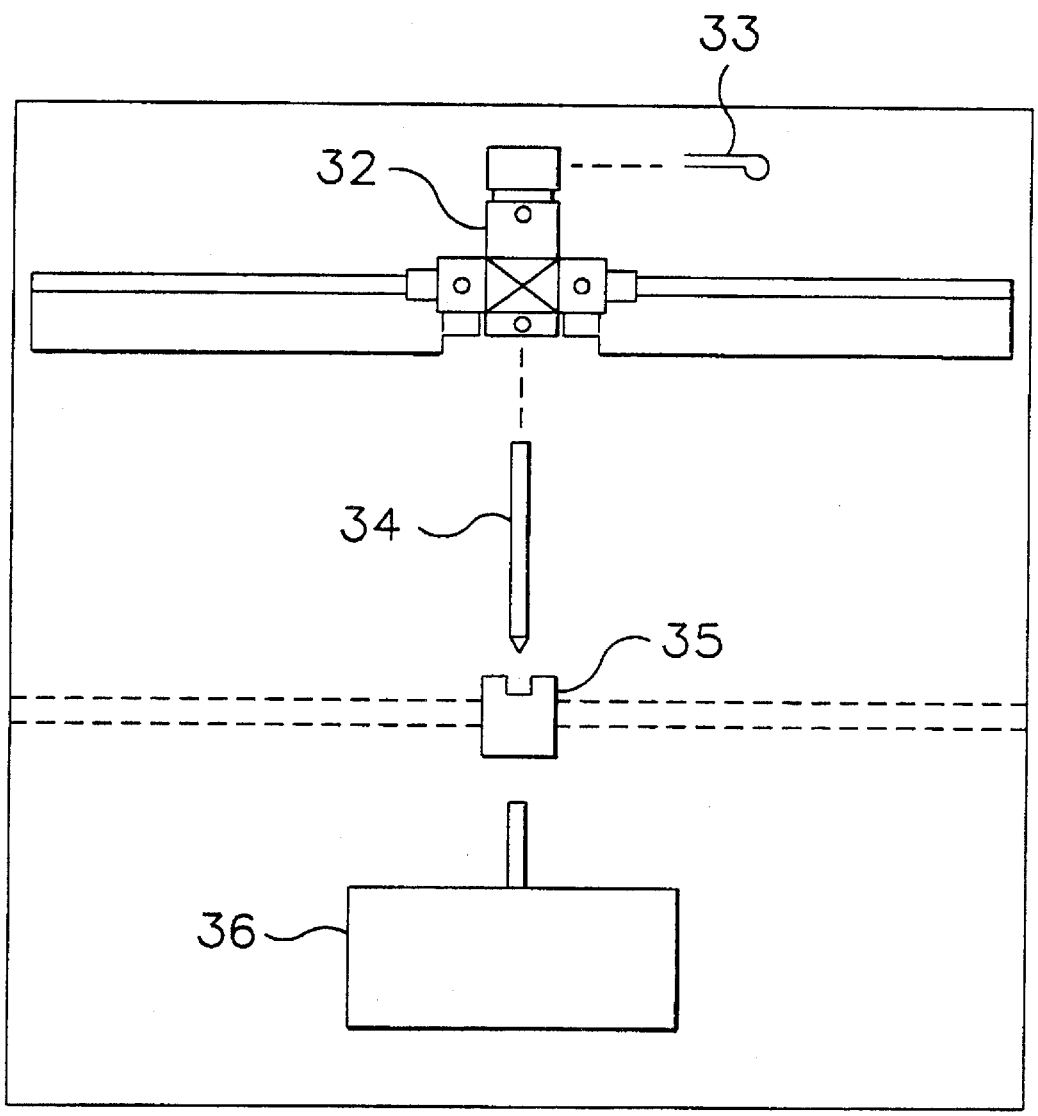

Referring now to FIGS. 1A, 1B and 1C, the subject compacting system "A" is arranged to receive emptied cardboard cartons or the like (not shown) and to ultimately produce as an end product burnable log formed from compacted chips of the cardboard material. Apparatus A includes the various components of the system attached to and supported on a structural frame member 1 which can be moved to various predetermined positions by roller wheels "B" located at the respective four lower corners of frame member 1.

The cartons are manually fed at the entrance end of the apparatus to a blade slitter assembly "C" which severs the sheet material along parallel lines into a plurality of strips which are in turn delivered to a transverse cutting means (chopper) 77 that severs the strips into a plurality of small chips of cardboard material that are passed through a rotary drum (barrel) 30 wherein glue is applied. The chips and glue are then discharged into a compression chamber assembly 11 wherein the chips are tightly compacted into a log like form for ultimate discharge as the finished unit. If the final product is to be a burnable log, the finished unit is then dipped in a wax-like bath to form a burnable outer coating thereon.

The slitter assembly comprises a lower assembly which includes first slitter blades 46 (0.0625×3.94×1.504 spring steel) and an upper slitter assembly which together form a gap through which the feed material passes and is slit into strips. The slot is approximately $\frac{5}{8}$ inch therebetween. The slitter blades 46 are disposed on a shaft 59 located therebetween to hold the blades in position. The upper slitter assembly has a cover 46a including a plurality of aligned side-by-side transversely-extending slits 46b. The outer portion of blades 46 are aligned with, and extend through and protrude from the slits, to a position above the top of the cover 46a. Shaft 59 is mounted at its respective ends for rotational movement within lower carriage plates 38 and 39, the low carriage plates in turn being held in positions by tie bars 41/tie bar nuts 42 and carriage bolts 40. The lower slitter is driven by slitter motor 43 (Char-Lynn 103-1006-008-060), preferably at a rate of approximately 50 RPM, through motor slitter gear 44 and motor gear key 45. The shaft 59 rotates by connection at its respective ends through slitter shaft bearings 48 and 51, spacer members 47 and 52 (FAFNIR RAICO w/T52 MST Mount), slitter gears 49 (Browning NS830) and associated slitter gear key 50, and bull gear 54 (Browning NC58112) and associated bull gear key 53 held in place by bull gear retainer clip 55. Since it has been found that as a practical matter standard cartons require a transfer shaft dimension of approximately 2½ feet, considerable pressure is necessary to achieve the proper advance of the cardboard material.

In a similar manner to the lower slitter assembly, the upper slit assembly comprises a shaft 57 about which are disposed rubber tire spacers 58 and which is mounted for rotational movement at its respective to upper carriage plates 56 via bearing 61, bearings 65 and 66 (similar to bearing 48), gear 68 (similar to gear 49), and gear key 69 (similar to gear key 50). In addition, the upper slitter includes a spring adjustment 60 and adjuster 62, as well as cam pin 63, adjuster arm 64, and timing gear 67 (Browning 18X6BU37), which serve to control the movement of the feed material within the gap formed between the lower and upper slitter portions to expedite the formation of strips of the feed material.

The strips produced by the slitter assembly are delivered to a transverse cutting apparatus or chopper 77. Preferably, the moving blade has a generally helical configuration so that the strips are cut successively so that the total amount of force required for the cutting operation is reduced, and conveniently can be in the form of a plurality of blades mounted in the helical configuration from a central rotary shaft 76 supported in suitable bearings and attachment means located in the side of the machine frame 1 so as to attain the general appearance of a standard lawn mower. For example, the shaft 76 includes a feed assist cover 70, a timing gear 71, a timing gear assist key 72, and hold downs 74 and 75. A feed assist belt 73 drives the cutter shaft 76 and the sprockets are preferably designed so that its rotation is correlated with the advance of the sheet material through the slicer unit, the ⅝ inch strips of cardboard being cut into chips whose dimension in the direction of motion is approximately ⅜ inch. The chopper 77 is mounted for rotational movement and has a chopper guard 81 placed in position for safety purposes, and include mower mount nuts 78, hanger bolt 84, and chopper guard bolt 80. The chips will fall by gravity through a slitting discharge chute 79 held in place by chute hanger 82 and chute bolt 83. The downward motion of the cutting blades 77 effects a fan like action which accelerates their downward motion and also directs downwardly any small particles of cardboard "dust" resultant from the longitudinal and transverse severing operations. Preferably the discharge chute 79 completely encompasses the transverse cutter so that no dust or chips can pass into the surrounding external environment.

The downwardly directed chips and any associated dust emerge from the chute 79 into the entrance end of the mentioned drum 30 supported for rotation and mounted from the machine frame 1. More particularly, the drum axis is displaced downwardly from its entrance to its exit end at an angle of approximately ten degrees. Thus, as the drum rotates, the chips will be tumbled therein and also will be gradually moved from the entrance to chute 29 located at the exit end thereof. Motor 6 (¼ HP 115 Volts) provides the power to rotate drum 30 and is connect to frame 1 by bolt 7. Drum 30 is connected to frame 1 within cradle assembly 10.

A glue spraying tank 31 which is the source of liquid water-soluble glue is arranged on top of the machine so as to direct and spray downward in the drum in a general conical configuration so as to intersect with the incoming chips and dust. Thus, the glue material is applied to the chips and because of the force of its spray also adds to the turbulent tubing action of the chips so that substantially all surfaces have the liquid adhesive applied thereto prior to their exit from the rotary drum 30. The glue material is applied through the use of glue pump 20 (Sur Flo 8005-293-224), the amount of water and the amount of glue material spray being set via respective solenoids 21 and 22. The tank 31 includes a lid 37 which seals off the gluemaking operations. The glue is continuously agitated by an agitator arm 32, held in place by a clip retainer 33, on a shaft 34 which rotates the arm 32 for purposes of mixing the glue. The shaft 34 is connected to a drive motor-agitator 36 via a bearing sealed shaft 35.

Figure 2:
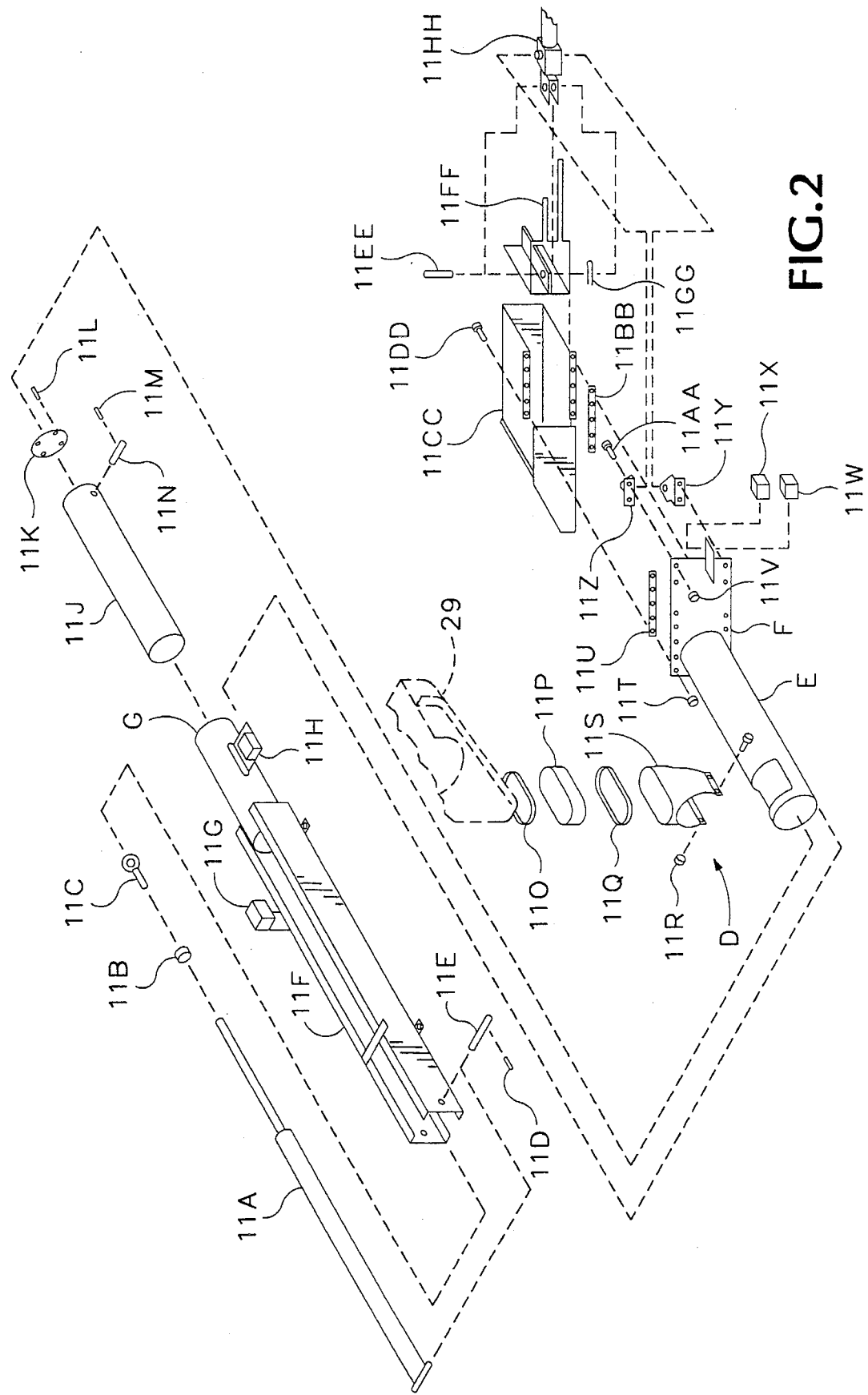
FIG. 2 is an exploded perspective view of the hydraulic cylinder assembly of the present invention.

As best seen in FIG. 2, the chips which exit from the rotary drum 30 drop into a downwardly-convergent discharge chute 29 whose lower extremity drops the chips into an opening in the top of boot assembly "D". The boot assembly D comprises a clamp 11o for clamping the chute 29 to the assembly D, boot member 11p, clamp 11q for clamping the boot member 11p to a sleeve 11s, and a sleeve bolt 11r for attaching the sleeve 11s to the compacting chamber "E", preferably an elongated cylindrical housing. Preferably, in order to avoid bridging and stoppage of flow of the chips downwardly though the chute 29. The chute 29 is flanged at its upper lateral edge and rests on frame members loosely so that the entire chute can be subjected to vibratory motion periodically in response to engagement by bushings 23 on the exterior of the rotary drum 30.

As best shown in FIG. 2, this cylindrical housing forms at one end a compaction chamber E for the chips delivered thereinto and includes a normal sliding exit gate 11ff at its exit extremity. Inside the chamber E is mounted a compaction ram or compression piston 11j connected to a hydraulic cylinder 11a via knuckle 11c and knuckle lock nut 11b for repeated compressive application of force to the chips deposited from the chute 29. Ram 11j is mounted within sleeve "E", which in turn is joined to hydraulic cylinder frame 11f, for such compressive application of force to the chips. Frame 11f is attached to frame 1 by bolt 12. The hydraulic cylinder 11a is connected to frame 11f by retainer clip and mount pin assembly 11d and 11e. Switch 11g is attached to frame 11f for setting the ram position, and switch 11h is joined to sleeve G for setting the length of log produced within chamber E. Ram 11j also includes a compression face 11k held in place by compression screw 11l and a wrist pin 11n held in place by retainer screw 11m. More particularly, upon the occasion of each predetermined charge of chips delivered to the chamber E, the ram 11j moves forwardly to compress that charge of chips against the exit gate F. Upper and lower gate spacer 11u and 11bb, and in turn connected to one end of log chute 11cc, are connected to the exit gate F by a log chute nut 11t and nut 11v. Upper and lower gate pivot mounts 11y and 11z, and in turn chute 11cc, are attached to gate F by bolt 11aa and mount bolt 11dd. Pivot pin 11ee connects gate 11ff to chute 11cc, and pivot pin retainer 11gg connects hydraulic cylinder gate 11hh to gate 11ff. Limit switches 11w and 11x are joined to gate frame F for positioning gate 11ff with respect to ram 11j. The gate 11ff and ram 11j operations are facilitated by gate and ram valves 2 (Vickers DG484 O12n WB51), and manifold 3 is employed in conjunction with valves 2. Bolts 4 and 5 are for connecting the valve mount and the hydraulic tank to frame 1. The hydraulic fluid for use in the hydraulic ram operations is contained in hydraulic reservoir 18 and is pumped employing the hydraulic pump and motor assembly 9 (Lincoln 10 HP). Pump 9 is mounted to frame 1 using bolt 24, the motor being shrouded for safety purposes by shield 25. The hydraulic fluid is cleaned by passing same through a filter 19.

The system of this invention is automatically controlled via the electronic controller 104 (GE 90-30 Microprocessor), in this case a programmable logic controller. The operation and programming of controller 104 are well known to those skilled in the art and are, therefore, not described in detail. With respect to the controller arrangement, electrical control box 13 is attached to frame 1 on control panel feed table 14 by bolt 15. The controls for the electronic controller unit are housed in enclosure 16 (Type 5622) which is attached to frame 1 by bolt 17.

Figure 3:
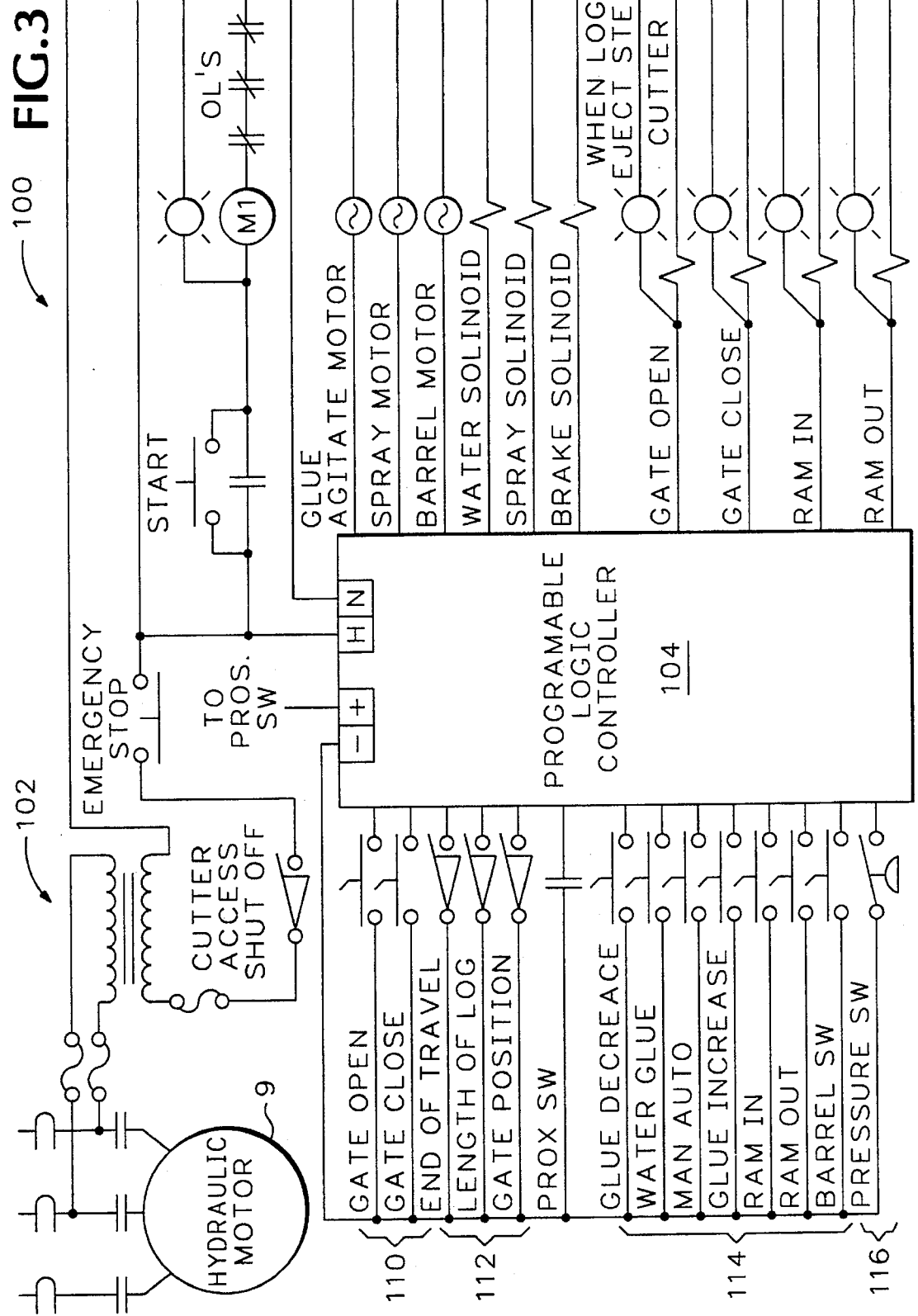
FIG. 3 is a circuit diagram of a control system for the apparatus shown above in FIGS. 1 and 2.

FIG. 3 is a circuit diagram of a control system 100 used in cooperation with the apparatus shown above in FIGS. 1 and 2. The control system 100 includes a programmable logic controller 104 that has an internal programmable read only memory (PROM) that stores parameters for operating the log machine. The logic controller 104 is coupled to motor control circuit 102 that controls motor 9. A starter circuit 103 is coupled to controller 104 for activating motor 9. Gate open and close buttons 110, sensor switches 112 and manual control buttons 114 are coupled to controller 104 and are used to manually initiate various function in the overall system. For example, depressing gate open button 110 opens gate 11$ff$. Depressing glue increase button 114 increases the amount of glue volume previously supplied to the cardboard material when forming a log. Switches 112 are used for monitoring the position of ram piston 11$j$, the length of the compressed material in barrel 30, and the position of gate 11$ff$. Pressure switch 116 monitors the level of compaction of the cardboard material when being compressed by ram 11$j$.

Motors 106 and solenoids 108 are activated by controller 104 according to the present conditions of the switches and buttons 110, 112, 114, 116 as described above in conjunction with timing and logic parameters previously stored in controller 104. The motors coupled to controller 104 include a glue agitate motor, spray motor and barrel motor. The solenoids 108 include water and spray solenoids for controlling the consistency of the glue material, a brake solenoid for temporarily stopping the cutter while the log is being ejected from the chamber E, gate open and close solenoids for opening and closing the gate 11$ff$, respectively and ram in and out solenoids for moving the ram back and forth in chamber E.

Figure 4:
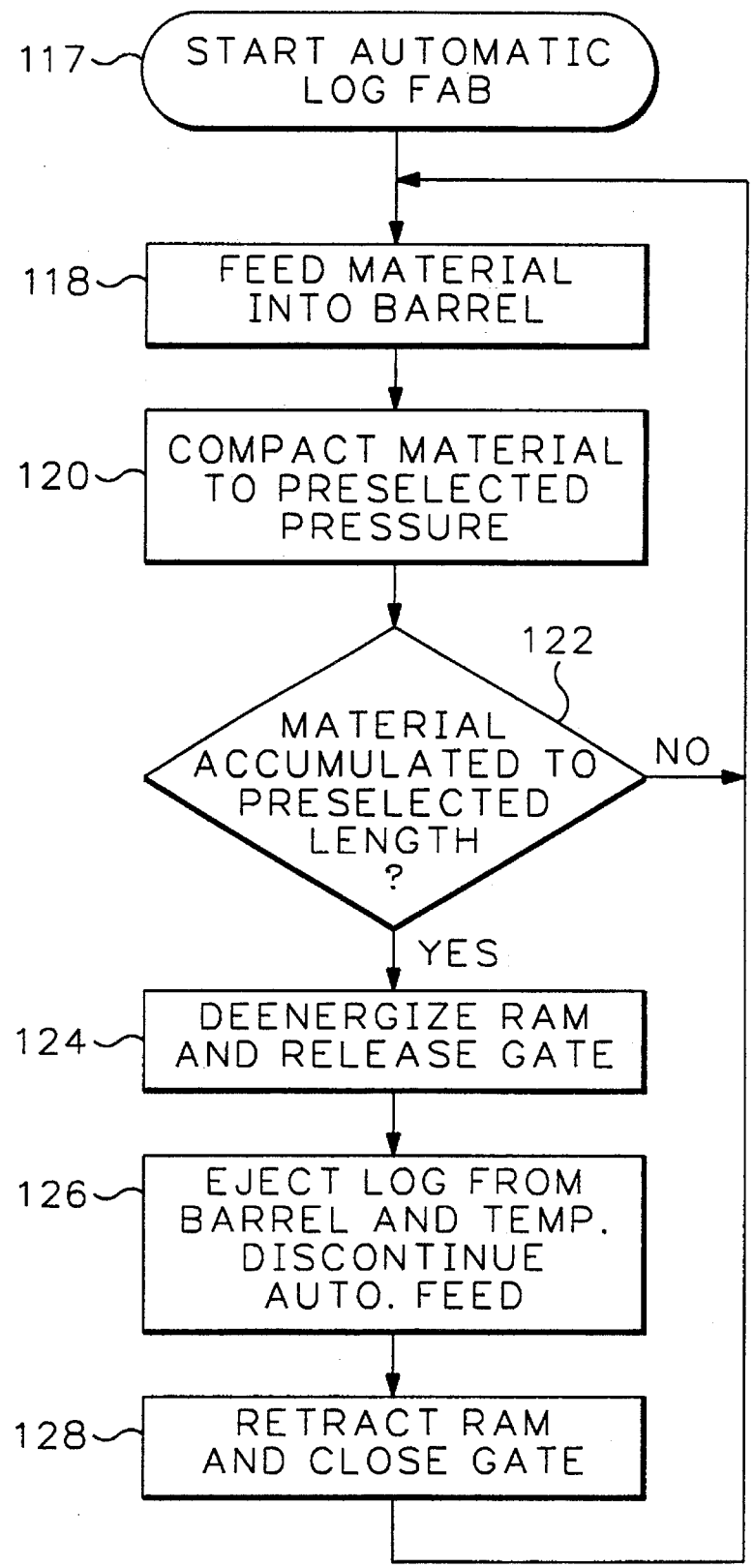
FIG. 4 is a flow diagram showing the automatic control functions performed by the control system of FIG. 3.

FIG. 4 is a flow diagram showing the automatic functions performed by the control system in FIG. 3. The log fabrication process is started in block 117 by depressing the push button in switching circuit 103 (see FIG. 3). Cutup cardboard material is then received in the barrel 30 in step 118. The ram 11$j$ compresses the cardboard material until the pressure switch 116 (FIG. 3) is activated. For example, pressure switch 116 closes when the pressure of the ram against the cardboard material reaches 750 pounds per square inch.

Decision step 122 monitors the length of the compressed cardboard material with length of log switch 112. If the accumulated length of the compressed material has not reached a predetermined length, decision step 122 returns to steps 118 and 120 to feed and compact more cardboard material in barrel 30. After the compacted cardboard material reaches the predetermined length, the length of log switch 112 closes causing decision step 122 to continue to step 124. Step 124 briefly de-energizes ram 11$j$ while at the same time opening gate 11$ff$. The temporary deactivation of ram 11$j$ reduces the pressure of the cardboard material upon gate 11$ff$ in turn allowing the gate 11$ff$ to open more easily. Step 126 then ejects the log from barrel 30, while at the same time temporarily discontinuing the feed process initiated in step 118. Step 128 then retracts the ram 11$j$ back into the barrel 30 and closes gate 11$ff$. The operation then returns to step 118 where cardboard material is again fed into barrel 30 for forming the next log.

What is claimed:

1. A method for forming burnable logs from adhesive-containing particularized feed material comprising the steps of:

introducing a first charge of the adhesive-containing particularized feed material into a compaction chamber;

compacting the first charge to a pressure, thereby forming a first compacted charge;

repetitively introducing additional charges into the compaction chamber and compacting each subsequent charge to substantially the same pressure against the previous charge forming a log of a length; and ejecting the log from the compaction chamber.

2. The method of claim 1, wherein the feed material is cardboard.

3. The method of claim 1, wherein the step of compacting each charge to a pressure comprises:

continuously monitoring the pressure at which each charge is compacted;

generating a pressure signal when the monitored pressure of each charge reaches the pressure; and compacting the charge until the pressure signal is generated.

4. The method of claim 1 further including the steps of:

continuously monitoring the length of the log;

generating a length signal when the monitored length reaches the length; and discontinuing introducing additional charges into the compaction chamber when the length signal is generated.

5. A method for producing burnable logs from feed material comprising the steps of:

particularizing the feed material;

combining an adhesive material with the particularized feed material forming an adhesive-containing particularized feed material;

introducing a first charge of the adhesive-containing particularized feed material into a compaction chamber;

compacting the first charge to a pressure thereby forming a first compacted charge;

introducing in a repetitive sequence additional charges of the adhesive-containing particularized feed material into the compaction chamber;

compacting to a pressure each additional charge against each previously introduced charge thereby forming a log of a length; and ejecting the log from the compaction chamber.

6. The method of claim 5, wherein the feed material is cardboard.

7. The method of claim 5, wherein compacting the first charge and each additional charge to a pressure comprises:

continuously monitoring the pressure at which the first charge and each additional charge is compacted;

generating a pressure signal when the monitored pressure reaches the pressure; and compacting the first charge and each additional charge until the signal is generated.

8. The method of claim 5 including the steps of:

continuously monitoring the length of the log during formation thereof;

generating a length signal when the monitored length reaches the length; and discontinuing introducing additional charges into the compaction chamber when the length signal is generated.

9. The method of claim 5 including the steps of:

continuously monitoring the length of the log;

generating a length signal when the monitored length reaches the length;

discontinuing particularizing the feed material when the length signal is generated; and re-initiating particularizing of the feed material after the log is ejected from the compaction chamber.

10. The method of claim 5 including the steps of:

continuously monitoring the length of the log;

generating a length signal when the monitored length reaches the length;

discontinuing combining the adhesive material with the particularized feed material when the length signal is generated; and re-initiating combining the adhesive material with the particularized feed material after the log is ejected from the compaction chamber.

11. The method of claim 5, wherein the step of particularizing the feed material comprises severing the feed material at spaced intervals thus reducing the feed material into a plurality of small chips.

12. The method of claim 5, wherein the step of combining an adhesive material with the particularized feed material comprises spraying the particularized feed material with the adhesive material.

13. The method of claim 5, wherein the step of combining an adhesive material with the particularized feed material comprises spraying the feed material with the adhesive material and then mixing the feed material and adhesive material until substantially complete coverage of the feed material by the adhesive material.

14. A system for producing burnable logs from feed material comprising:

a compaction chamber having a ram for compacting feed material within the compaction chamber having a chamber opening, said ram being energized in response to an activation signal and being de-energized in response to a deactivation signal;

a pressure sensor for monitoring the pressure at which particularized feed material is compacted, said pressure sensor generating a pressure signal when the monitored pressure reaches a pressure; and a programmable controller for reading the pressure signal and generating the activation and deactivation signals, said controller being programmed to repetitively generate the activation signal until the pressure signal is generated, then discontinuing generating the activation signal and generating the deactivation signal.

15. The system of claim 14 wherein the feed material is cardboard.

16. The system of claim 14 which further includes a length sensor for continuously monitoring the length of the log, said sensor generating a length signal when the monitored length of the log reaches a length;

a gate located at the compaction chamber opening for opening the compaction chamber and allowing the ram to eject the log from the chamber, said gate opening in response to a gate signal; and a gate signal programmed in the controller which is generated when the length signal is generated which energizes the ram, the ram ejecting the log from the chamber.

17. The system of claim 14 which further includes a mixer for combining the particularized feed material with an adhesive material, said mixer discontinuing mixing in response to a stop-mixing signal; and a stop-mixing signal programmed in the controller which is generated when the length signal is generated.

18. The system of claim 14 wherein the mixer includes a sprayer for spraying an adhesive material onto the feed material.

19. The system of claim 14 wherein the mixer includes a rotating drum for mixing an adhesive material with the feed material until substantially complete coverage of the feed material by the adhesive material.

20. The system of claim 14 which further includes a cutter for particularizing the feed material, said cutter discontinuing particularizing in response to a stop-cutting signal; and a stop-cutting signal which is programmed in the controller and which is generated when the length signal is generated.

* * * * *